United States Patent
Galles et al.

(10) Patent No.: US 6,651,157 B1
(45) Date of Patent: Nov. 18, 2003

(54) MULTI-PROCESSOR SYSTEM AND METHOD OF ACCESSING DATA THEREIN

(75) Inventors: Michael B. Galles, Los Altos, CA (US); Jeffrey S. Kuskin, Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/418,520

(22) Filed: Oct. 15, 1999

(51) Int. Cl.[7] ............................................. G06F 15/173
(52) U.S. Cl. ............................. 712/28; 712/30; 712/29; 711/141; 711/148; 711/220
(58) Field of Search ................................. 707/200, 201; 711/114, 121, 133, 136, 141, 144, 145, 148, 153, 160, 165, 173, 209, 220, 146; 712/1, 28, 29, 30

(56) References Cited

U.S. PATENT DOCUMENTS

| | | | | |
|---|---|---|---|---|
| 5,303,362 A | * | 4/1994 | Butts, Jr. et al. | 711/121 |
| 5,394,555 A | * | 2/1995 | Hunter et al. | 711/148 |
| 5,522,058 A | * | 5/1996 | Iwasa et al. | 711/145 |
| 5,699,551 A | * | 12/1997 | Taylor et al. | 711/207 |
| 5,802,578 A | * | 9/1998 | Lovett | 711/147 |
| 5,829,052 A | * | 10/1998 | Pawlowski et al. | 711/147 |
| 5,890,217 A | * | 3/1999 | Kabemoto et al. | 711/141 |
| 5,944,780 A | * | 8/1999 | Chase et al. | 709/201 |
| 6,088,769 A | | 7/2000 | Luick et al. | 711/141 |
| 6,092,155 A | * | 7/2000 | Olnowich | 711/142 |
| 6,148,378 A | * | 11/2000 | Bordaz et al. | 711/147 |

FOREIGN PATENT DOCUMENTS

| EP | 0 817 069 A1 | 1/1998 | ........... G06F/12/08 |
|---|---|---|---|
| EP | 0 881 579 A1 | 12/1998 | ........... G06F/12/08 |

OTHER PUBLICATIONS

Dowd et al., "Photonic Architectures for Distributed Shared Memory Multiprocessors," *Prceedings of the Fourth International Symposium on Massively Parallel Processing Using Optical Interconnections*, IEEE, pp. 151–161, 1994.*
Lenoski, et al., "The Directory–Based Cache Coherence Protocol for the DASH Multiprocessor," XP 000144781, Proceedings of the 17th Annual International Symposium on Computer Architecture, *IEEE Computer Society Press*, May 28–31, 1990, 13 pages.
Laudon, et al., "The SGI Origin: A ccNUMA Highly Scalable Server," XP–000738168, *Silicon Graphics, Inc.*, Feb. 6, 1997, 11 pages.
International Search Report in International Application No. PCT/US 00/25596, dated Dec. 21, 2000, 7 pages.

* cited by examiner

*Primary Examiner*—William M. Treat
(74) *Attorney, Agent, or Firm*—Baker Botts L.L.P.

(57) ABSTRACT

A multi-processor system (10) includes a plurality of processors (12). Each processor (12) has an integrated memory (16) operable to provide, receive, and store data. Each processor (12) also includes an integrated memory controller (30) in order to control read and write access to the integrated memory (16). Additionally, each processor (12) includes an integrated memory directory (18) operable to maintain a plurality of memory references to data within the integrated memory (16). The multi-processor system (10) also includes an external switch (14) coupled to each of the plurality of processors (12). The external switch (14) passes data to and from any of the plurality of processors (12). The external switch (14) has an external directory (22). The external directory (22) provides a memory reference for each of the plurality of processors (12) to remote data that is not provided within its own integrated memory directory (18).

5 Claims, 2 Drawing Sheets

MULTI-PROCESSOR SYSTEM AND METHOD OF ACCESSING DATA THEREIN

BACKGROUND OF THE INVENTION

Controlling access to memory in a multi-processor system is a difficult process, especially when many processors share data in memory. Typically, each processor maintains a small cache of most frequently used data for quick access so that time consuming requests for data to the common system memory may be avoided. However, the cache for each processor must be updated with changes made to its associated data that are reflected in the common system memory. One technique for updating processor caches is to couple each processor to what's known as a snoopy bus. A request for access to data by a requesting processor is broadcast to other processors over the snoopy bus. Each processor "snoops" into their cache to see if it has the most recent copy of the requested data. If a processor does have a most recent copy of the requested data, then that processor provides the data to the requesting processor. If no processor has a most recent copy of the requested data, a memory access is required to fulfill the requesting processor's request. If a processor updates a memory location, this update is broadcasted over the snoopy bus to the other processors in the system. Each processor checks its cache to see if it has the data corresponding to the updated memory location. If so, the processor may either remove that data and corresponding memory location from its cache or update its cache with the new information. This snoopy bus technique is effective for a small number of processors within a computer system but is ineffective for computer systems having hundreds of processors.

Another technique is to provide a directory based memory configuration. For directory based memories, a directory is used to maintain a directory entry corresponding to every entry in memory. The directory entry specifies whether the associated data in memory is valid or where the most recent copy of the data may be accessed. The directory based memory configuration avoids coupling all the processors in the computer system together and having processors be bothered handling broadcast requests found in snoopy bus designs. Communication only needs to occur with the processor having the most recent copy of the data. The size of the directory provides the constraint for this configuration as the directory would become too large to support the number of processors and memories in a large computer system. Therefore, it is desirable to provide a memory access control mechanism for computer systems with a large number of processors.

SUMMARY OF THE INVENTION

From the foregoing, it may be appreciated that a need has arisen for providing a multi-processor system with processors having integrated memories and memory directories linked together through an external directory. In accordance with the present invention, a multi-processor system and method of accessing data therein are provided that substantially eliminate or reduce disadvantages and problems of conventional multi-processor systems.

According to an embodiment of the present invention, there is provided a multi-processor system that includes a plurality of processors, wherein each processor includes an integrated memory, an integrated memory controller, and an integrated memory directory. The integrated memory provides, receives, and stores data. The integrated memory controller controls access to and from the integrated memory. The integrated memory directory maintains a plurality of memory references to data within the integrated memory. The multi-processor system also includes an external switch coupled to each of the plurality of processors. The external switch passes data to and from any of the plurality of processors. The external switch includes an external directory. The external directory provides a memory reference to remote data for each of the plurality of processors that is not provided within its own integrated memory directory.

The present invention provides various technical advantages over conventional multi-processor systems. For example, one technical advantage is to integrate memory, memory control, and memory directory into a processor. Another technical advantage is the ability to extend the integrated memory directory capability with external support in order to implement large cache coherent multi-processor systems. Yet another technical advantage is to remove large system directory policy decisions from the individual processor in the system. Still another technical advantage is to provide a directory protocol that can be used with commodity processors having integrated memories and directories. Other technical advantages may be readily ascertainable by those skilled in the art from the following figures, description, and claims.

DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
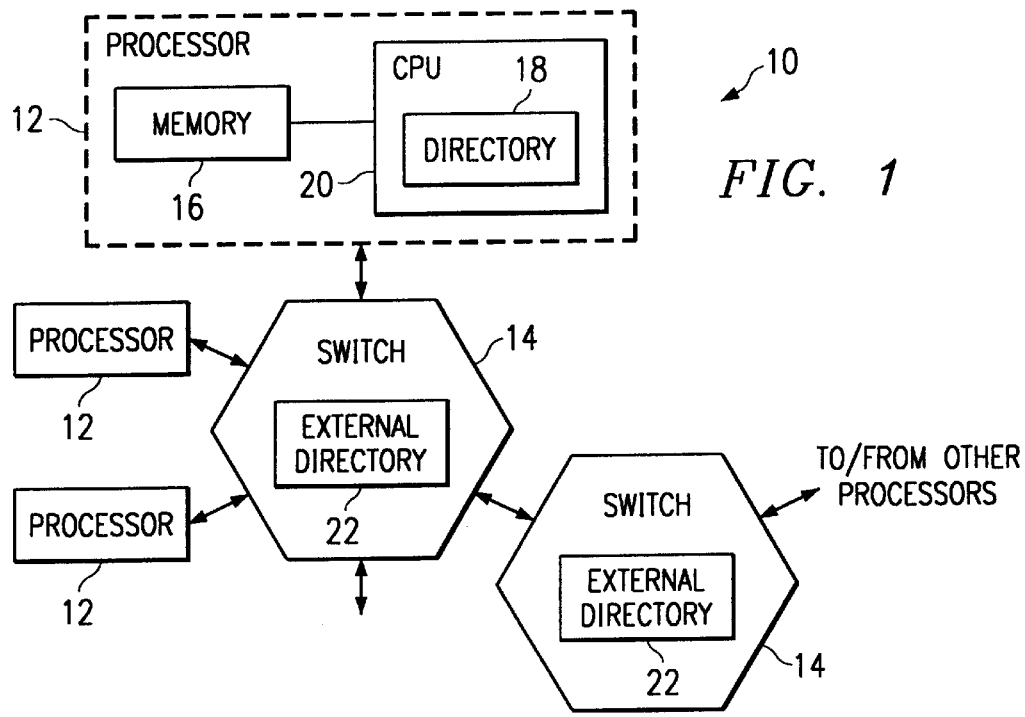
FIG. 1 illustrates a block diagram of a multi-processor system.

FIG. 1 is a block diagram of a multi-processor system 10. Multi-processor system 10 includes a plurality of processors 12 and an external switch 14. Each of the plurality of processors 12 has a memory 16, a memory directory 18, and a central processing unit 20 all integrated into a single device. External switch 14 includes an external directory 22. Each processor 12 may couple to external switch 22 in order to exchange among each other data stored in their respective memories. External switch 22 may also couple to another external switch 22 in order to enlarge the capabilities of multi-processor system 10.

In operation, memory directory 18 of a particular processor 12 includes memory references to data stored within its corresponding memory 16. For smaller multi-processor systems, memory directory 18 may also include memory references to data stored in a remote memory 16 associated with a different processor 12 within a local regional group. As memory sizes and systems become larger, an individual memory directory 18 of a particular processor 12 may not be able to include a memory reference to all data in the system which the particular processor 12 desires to access. In order to alleviate this situation, external directory 22 of external switch 14 includes a capability to retrieve memory references to data in memories remote from the particular processor 12.

When the particular processor 12 desires to access data from a remote memory 16, its memory directory 18 determines that it does not have a memory reference to the desired data. Memory directory 18 generates a data request that is sent to external directory 22 in external switch 14. External directory 22 processes the request and generates a memory reference to the desired data. External switch 14 uses the generated memory reference to retrieve the desired data and provide it to the requesting processor 12.

Memory directory 18 preferably holds memory references to data that has been most recently accessed. If data is requested by the particular processor 12 and that data resides in its associated memory 16, then memory directory 18 generates a memory reference to the new data. If memory directory 18 is fully occupied with memory references, then memory directory 18 may overwrite the memory reference to data that has not been accessed for the longest period of time with the newly generated memory reference. External directory 22 may operate in a similar manner by maintaining memory references to most recently accessed data from among the plurality of processors 12 and only generate a new memory reference for a request to data not currently represented by a memory reference within external directory 22. Though not necessary, memory references within each memory directory 18 may be represented in a similar manner as memory references in external directory 22.

Figure 2:
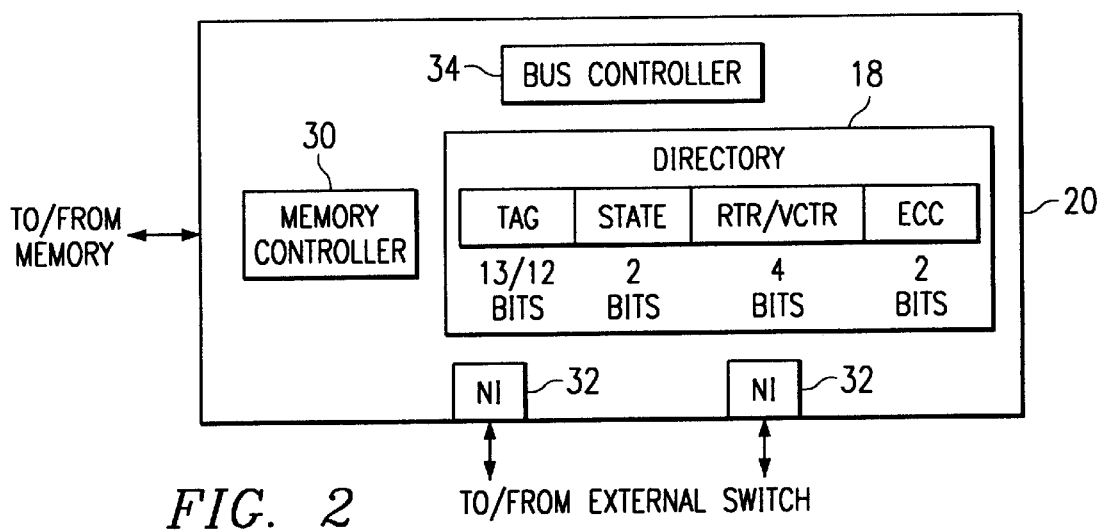
FIG. 2 illustrates a block diagram of a processor within the multi-processor system.

FIG. 2 is a block diagram of a processor 12. Processor 12 includes memory 16, a memory controller 30, memory directory 18, one or more network interfaces 32, and a CPU controller 34. Network interfaces 32 provide a communication capability between processor 12 and external switch 22. Memory controller 30 controls the read and write access from and to memory 16. CPU controller 34 controls flow between one or more processing units.

The size of memory directory 18 may vary according to the size of its associated memory 16. For example, a processor 12 holding eight megabytes with sixty-four byte lines of cache in a four to one ratio may use 2(17) entries. Using a four gigabyte dynamic random access memory for memory 16, memory references may be represented by thirteen bit tags, two state bits, four pointer/vector bits and two error correction code (ECC) bits. With twenty-one bits per entry and 2(17) entries, memory directory 18 has a size of 2.6 Megabytes. As another example, a processor 12 holding thirty-two megabytes with one hundred twenty-eight byte lines of cache in a four to one ratio may use 2(18) entries. Using an eight gigabyte dynamic random access memory for memory 16, memory references may be represented by twelve bit tags, two state bits, four pointer/vector bits and two ECC bits. With twenty bits per entry and 2(18) entries, memory directory 18 has a size of 5 Megabytes.

With the presence of external directory 22, each memory directory 18 may be set up to track its local memory 16 cached memory references. External directory 22 may be set up to track remote cached memory references for the processors 12. Through the use of memory directories 18 and at each processor 12 and external directories 22 in a large multi-processor system 10 environment, cache coherency is provided to ensure that all processors 12 have an accurate view of the entire system memory. Requests for memory may even be passed from one external switch 14 to another to further extend the memory and access mechanism of multi-processor system 10.

Figure 3:
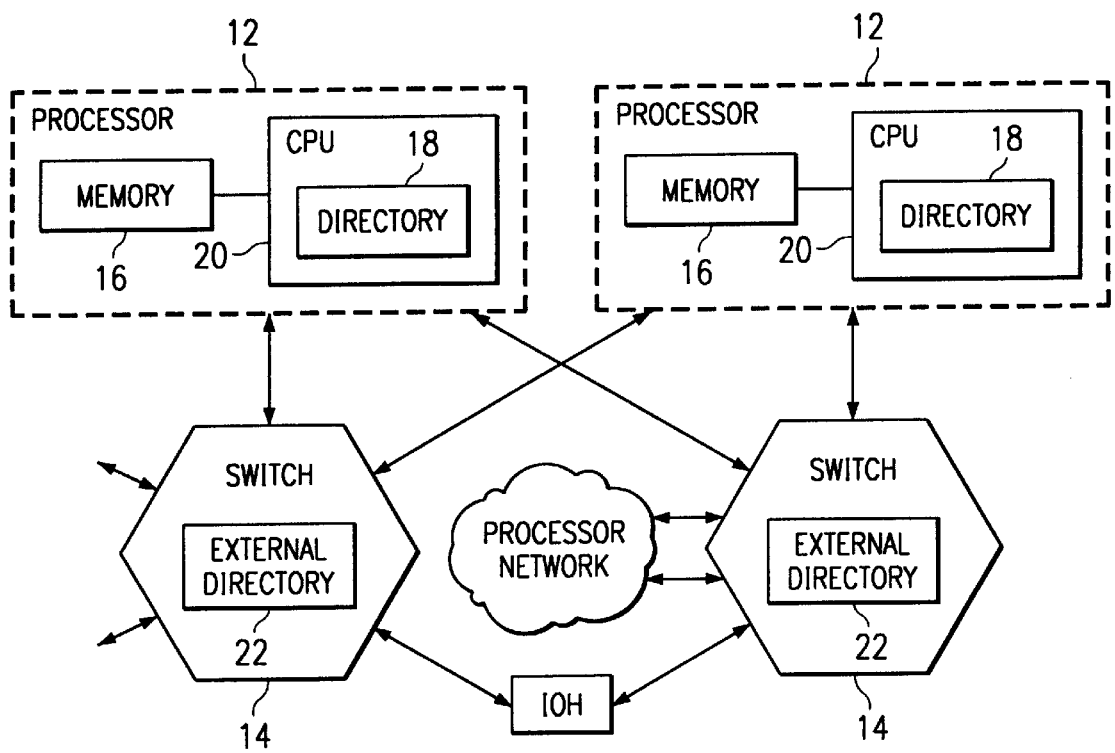
FIG. 3 illustrates a block diagram of an alternate embodiment of the multi-processor system.

FIG. 3 shows an alternate embodiment of multi-processor system 10. In this embodiment, processors 12 are coupled to two external switches 14. The two external switches 14 provide two routing planes for memory access and coherence. The two routing planes may provide redundancy for multi-processor system 10 or extend the bandwidth capability of multi-processor system 10 to incorporate a larger number of processors 12. Memory directories 18 within each processor 12 may support its associated local memory 16 and support a group of processors 12 within a local region depending on the desired size of each memory directory 18. Access to memory outside of a processor 12 or local region of processors 12 not supported by an individual memory directory 18 is handled by one or more external directories 22 and external switches 14. External switches 14 may also couple to input/output hosts 26 in order to support operations therewith. Each external switch 14 may also support processor network 28 extensions.

Thus, it is apparent that there has been provided in accordance with the present invention, a multi-processor system and method of accessing data therein that satisfies the advantages set forth above. Although the present invention has been described in detail, various changes, substitutions, and alterations may be readily ascertainable by those skilled in the art and may be made herein without departing from the spirit-and scop of the present invention as defined by the following claims.

What is claimed is:

1. A multi-processor system, comprising:

a plurality of processors, each processor including an integrated memory operable to provide/receive/store data, each processor including an integrated memory controller operable to control access to the integrated memory, each processor including an integrated memory directory operable to maintain a plurality of memory references to data within the integrated memory;

an external switch coupled to each of the plurality of processors, the external switch operable to pass data to and from any of the plurality of processors, the external switch including an external directory, the external directory operable to provide a memory reference for each of the plurality of processors to remote data that is not provided within its own integrated memory directory;

wherein the plurality of memory references are represented by bit tags, state bits, pointer/vector bits, and ECC bits.

2. The multi-processor system of claim 1, wherein the integrated memory of a particular one of the plurality of processors holds four gigabytes of data resulting in the plurality of memory references being represented by thirteen bit tags, two state bits, four pointer/vector bits, and two ECC bits.

3. The multi-processor system of claim 1, wherein the integrated memory of a particular one of the plurality of processors holds eight gigabytes of data resulting in the plurality of memory references being represented by twelve bit tags, two state bits, four pointer/vector bits, and two ECC bits.

4. A method of accessing data in a multi-processor system, comprising:

storing information in a local memory;

maintaining a list of memory references to the information in the local memory;

generating a request for data;

determining whether the data is associated with information stored in the local memory and has a memory reference;

forwarding the request to an external switch in response to the data not having a memory reference, the data not having a memory reference to the local memory being data stored in a remote memory;

identifying a memory reference for the data in response to the request;

obtaining the data from the remote memory via the external switch in response to the identified memory reference;

representing the identified memory reference with bit tags, pointer/vector bits, state bits and ECC bits.

5. A processor in a multi-processor system, comprising:

a local memory integrated in the processor and operable to provide/receive/store data;

a memory controller integrated in the processor and operable to control access to and from the local memory;

a memory directory integrated in the processor and operable to maintain memory references to data within the local memory, the memory directory operable to generate a data request for data not having a memory reference;

a network interface integrated in the processor and operable to provide the data request to an external directory external to the processor, the network interface operable to provide a memory reference generated by the external directory to the memory directory;

wherein the memory references are represented with bit tags, state bits, pointer/vector bits, and ECC bits.

* * * * *